(12) United States Patent
Yang et al.

(10) Patent No.: US 12,480,987 B2
(45) Date of Patent: Nov. 25, 2025

(54) DYNAMIC VOLTAGE STRESS CONDITION OPTIMIZATION METHOD AND DYNAMIC VOLTAGE STRESS CONDITION OPTIMIZATION SYSTEM CAPABLE OF PERFORMING BLOCK-BASED DYNAMIC VOLTAGE STRESS WAFER TESTING PROCESS

(71) Applicant: MEDIATEK INC., Hsin-Chu (TW)

(72) Inventors: Yu-Lin Yang, Hsinchu (TW); Po-Chao Tsao, Hsinchu (TW); Yun-San Huang, Hsinchu (TW); Chia-Chun Sun, Hsinchu (TW); Chin-Wei Lin, Hsinchu (TW); Tung-Hsing Lee, Hsinchu (TW); Chih-Min Lin, Hsinchu (TW); Chia-Yu Yang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 145 days.

(21) Appl. No.: 18/407,466

(22) Filed: Jan. 9, 2024

(65) Prior Publication Data
US 2025/0224442 A1    Jul. 10, 2025

(51) Int. Cl.
*G01R 31/28* (2006.01)

(52) U.S. Cl.
CPC ....... *G01R 31/2879* (2013.01); *G01R 31/287* (2013.01); *G01R 31/2875* (2013.01); *G01R 31/2894* (2013.01)

(58) Field of Classification Search
CPC .................................................... G01R 31/00
See application file for complete search history.

(56) References Cited

U.S. PATENT DOCUMENTS 6,140,832 A * 10/2000 Vu ..................... G01R 31/3004
714/740
11,808,813 B2   11/2023 Deshmane
(Continued)

FOREIGN PATENT DOCUMENTS

CN     113406473 A    9/2021
CN     117316838 A   12/2023

OTHER PUBLICATIONS

Chen He et al., Wafer Level Stress: Enabling Zero Defect Quality for Automotive Microcontrollers without Package Burn-In, International Test Conference, 2020, p. 1-10, IEEE, XP033880830, 2020.

(Continued)

*Primary Examiner* — Tung X Nguyen
(74) *Attorney, Agent, or Firm* — Winston Hsu

(57) ABSTRACT

A dynamic voltage stress (DVS) condition optimization includes selecting a testing block from a plurality of blocks in a die of a wafer, acquiring a plurality of testing block measurement temperatures of the testing block when the testing block is processed by a DVS testing flow, acquiring a correlation table of the plurality of testing block measurement temperatures and a plurality of DVS block predict temperatures of the testing block, configuring a tip burnt block temperature according to the testing block measurement temperatures, determining a DVS block target temperature selected from the DVS block predict temperatures according to the correlation table and the tip burnt block temperature, and generating a DVS block voltage for applying to the testing block in the die of the wafer according to the DVS block target temperature.

20 Claims, 8 Drawing Sheets

(56) References Cited

U.S. PATENT DOCUMENTS

2021/0341342 A1* 11/2021 Qian .................. H01L 22/14
2022/0178994 A1   6/2022 Agawa
2023/0384365 A1  11/2023 Kim

OTHER PUBLICATIONS

Chen He, Automotive Semiconductor Test: Challenges and Solutions towards Zero Defect Quality (Invited Paper), p. 1-11, IEEE, XP034448575, Oct. 2, 2023.
Jongsoo Yim et al., A Prevenient Voltage Stress Test Method for High Density Memory, 4th IEEE International Symposium on Electronic Design, Test & Applications, 2008, p. 516-520, IEEE, XP031234545, 2008.
Ghil-Geun Oh et al., Dynamic Voltage Stress Sensing Circuits for Screening Out Early Device Reliability Issues in Advanced Technology Nodes, IEEE ASSCC 2021/ Session 1/ Paper 1.3, Korea, Nov. 7-10, 2021, p. 1-3, XP034044458, Nov. 7, 2021.
William R. Mann, Wafer Test Methods to Improve Semiconductor Die Reliability, IEEE Design & Test of Computers, 2008, p. 528-537, XP011239487, 2008.

* cited by examiner

DYNAMIC VOLTAGE STRESS CONDITION OPTIMIZATION METHOD AND DYNAMIC VOLTAGE STRESS CONDITION OPTIMIZATION SYSTEM CAPABLE OF PERFORMING BLOCK-BASED DYNAMIC VOLTAGE STRESS WAFER TESTING PROCESS

BACKGROUND

With the rapid development of technologies, an improvement in wafer yield is an important issue of wafer fabrication in industry. To improve the reliability of the wafer fabrication, to reduce dynamic voltage stress (DVS) failure rate and defect parts per million (DPPM) are two major goals. Specifically, a DVS test can be applicable to sense process variations of critical layers, points, or weak layout patterns of a testing product. For wafer defect-based testing process, when DVS conditions are optimized, the DPPM can be reduced. However, in the current DVS test, a fixed DVS voltage is applied with all blocks of a die. As a result, the current DVS test is not optimized.

Therefore, developing a DVS condition optimization method for improving the wafer defect-based testing process is an important issue.

SUMMARY

In an embodiment of the present invention, a dynamic voltage stress (DVS) condition optimization method is disclosed. The DVS condition optimization method comprises selecting a testing block from a plurality of blocks in a die of a wafer, acquiring a plurality of testing block measurement temperatures of the testing block when the testing block is processed by a DVS testing flow, acquiring a correlation table of the plurality of testing block measurement temperatures and a plurality of DVS block predict temperatures of the testing block, configuring a tip burnt block temperature according to the testing block measurement temperatures, determining a DVS block target temperature selected from the DVS block predict temperatures according to the correlation table and the tip burnt block temperature, and generating a DVS block voltage for applying to the testing block in the die of the wafer according to the DVS block target temperature.

In another embodiment of the present invention, a dynamic voltage stress (DVS) condition optimization system is disclosed. The DVS condition optimization system comprises at least one wafer testing station, a memory, and a processor. The processor is coupled to the memory and the at least one wafer testing station. The processor selects a testing block from a plurality of blocks in a die of a wafer. The processor acquires a plurality of testing block measurement temperatures of the testing block from the at least one wafer testing station when the testing block is processed by a DVS testing flow. The processor acquires a correlation table of the plurality of testing block measurement temperatures and a plurality of DVS block predict temperatures of the testing block. The correlation table is saved in the memory. The processor configures a tip burnt block temperature according to the testing block measurement temperatures. The processor determines a DVS block target temperature selected from the DVS block predict temperatures according to the correlation table and the tip burnt block temperature. The processor generates a DVS block voltage for applying to the testing block in the die of the wafer according to the DVS block target temperature.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
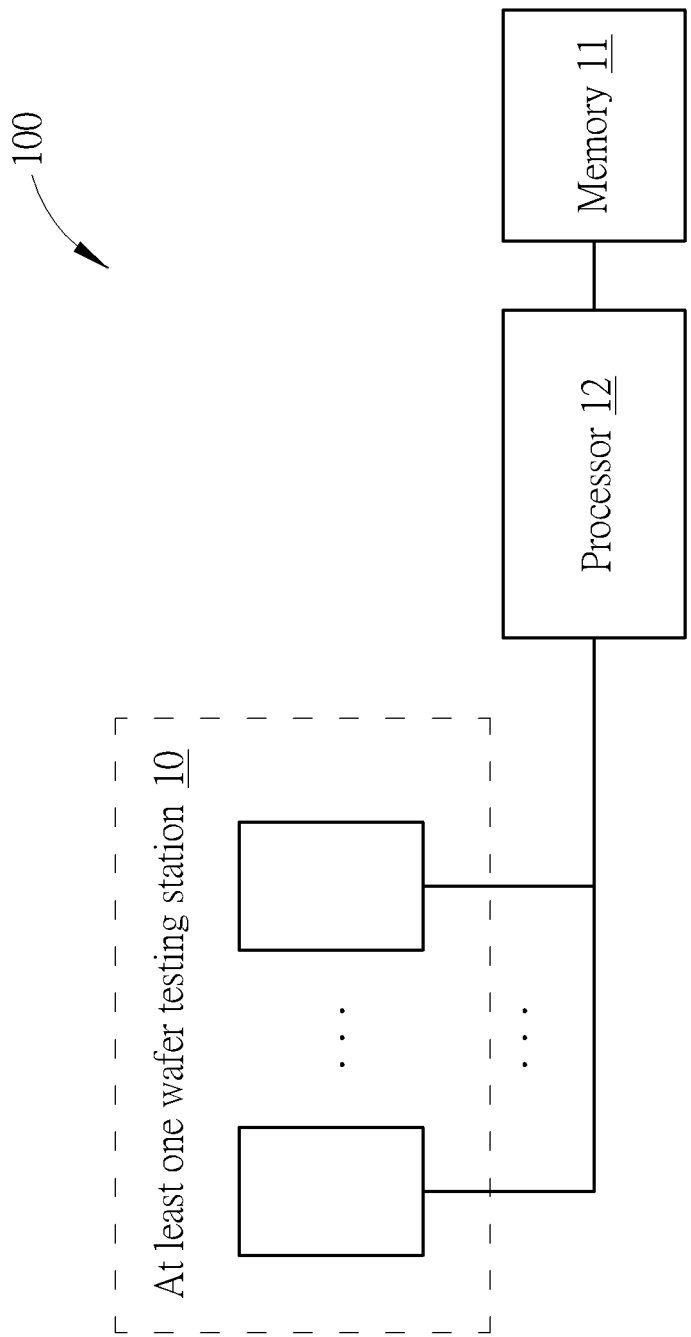
FIG. 1 is a block diagram of a dynamic voltage stress condition optimization system according to a first embodiment of the present invention.

FIG. 1 is a block diagram of a dynamic voltage stress (DVS) condition optimization system 100 according to a first embodiment of the present invention. The DVS condition optimization system 100 includes at least one wafer testing station 10, a memory 11, and a processor 12. The at least one wafer testing station 10 can be used for processing a wafer testing flow. The memory 11 is used for saving data, such as parameters of a machine learning model and/or a correlation table. The processor 12 is coupled to the memory 11 and the at least one wafer testing station 10 for determining an appropriate DVS block voltage. In the DVS condition optimization system 100, the processor 12 selects a testing block from a plurality of testing blocks in a die of a wafer. For example, the processor 12 can select a central processing unit (CPU) block as the testing block. Particularly, the CPU block requires high power consumption. Therefore, the CPU block has the worst temperature tolerance compared with other blocks. After the testing block is selected, the processor 12 acquires a plurality of testing block measurement temperatures of the testing block from the at least one wafer testing station 10 when the testing block is processed by a DVS testing flow. Here, the "testing block measurement temperatures" can be regarded as real temperatures measured from the at least one wafer testing station 10. Then, the processor 12 can acquire the correlation table of the plurality of testing block measurement temperatures and a plurality of DVS block predict temperatures of the testing block. The correlation table can be saved in the memory 11. The processor 12 can configure a tip burnt block temperature according to the testing block measurement temperatures. The tip burnt block temperature can be regarded as a maximum tolerance temperature of the testing block under the DVS testing flow. Then, the processor 12 can determine a DVS block target temperature selected from the DVS block predict temperatures according to the correlation table and the tip burnt block temperature. Finally, the processor 12 can generate a DVS block voltage for applying to the testing block in the die of the wafer according to the DVS block target temperature. In the DVS condition optimization system 100, the processor 12 can adjust the DVS block voltage for applying to another testing block in the die of the wafer. In other words, the die of the wafer includes a plurality of testing blocks. The plurality of testing blocks can be applied with different DVS block voltages. Details of optimizing the DVS conditions for adaptively applying to different testing blocks are illustrated below.

Figure 2:
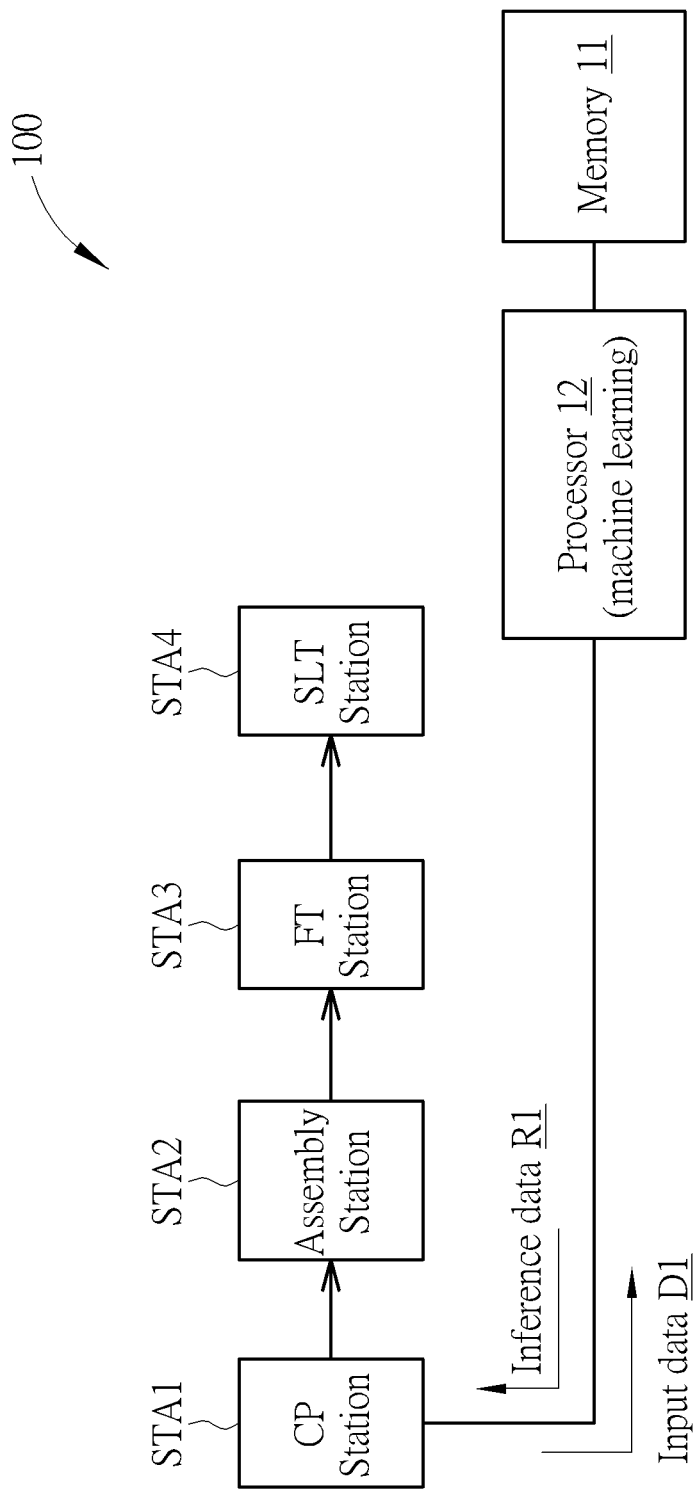
FIG. 2 is an illustration of a first data flow mode of the dynamic voltage stress condition optimization system in FIG. 1.
Figure 3:
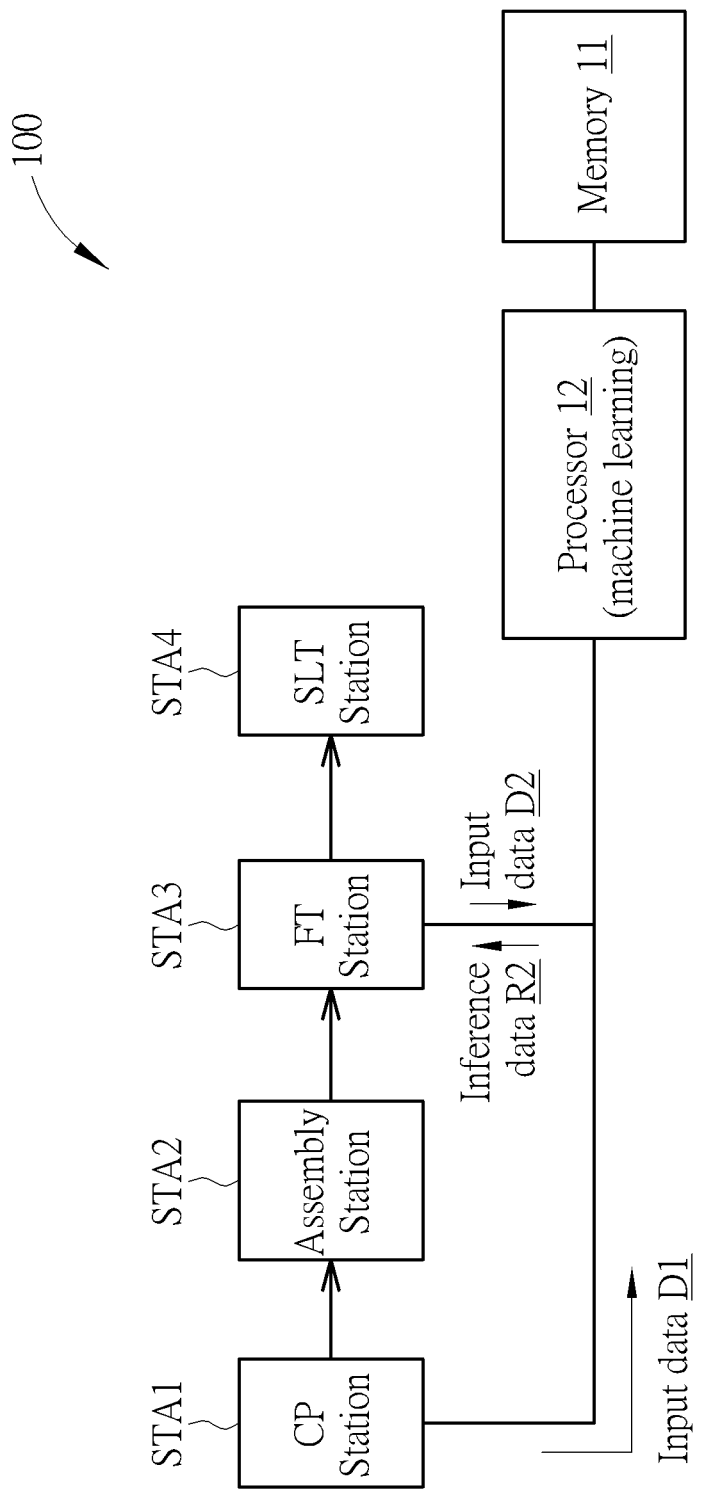
FIG. 3 is an illustration of a second data flow mode of the dynamic voltage stress condition optimization system in FIG. 1.
Figure 4:
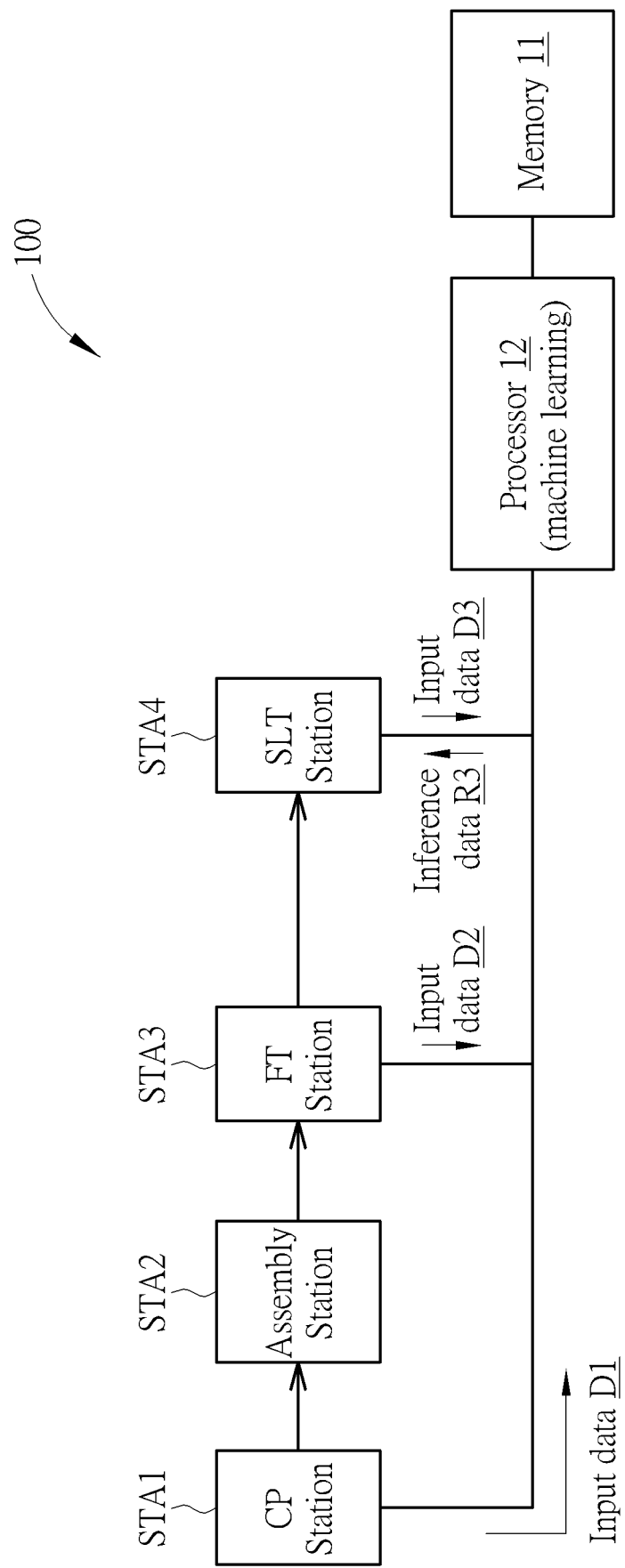
FIG. 4 is an illustration of a third data flow mode of the dynamic voltage stress condition optimization system in FIG. 1.

FIG. 2 is an illustration of a first data flow mode of the DVS condition optimization system 100. FIG. 3 is an illustration of a second data flow mode of the DVS condition optimization system 100. FIG. 4 is an illustration of a third data flow mode of the DVS condition optimization system 100. As previously mentioned, the at least one wafer testing station 10 can be used for processing a wafer testing flow. For example, in FIG. 2 to FIG. 4, a chip probe (CP) stage, an assembly stage, a final test (FT) stage, and a system-level testing (SLT) stage are introduced. The CP stage is performed by a CP station STA1. The assembly stage is performed by an assembly station STA2. The FT stage is performed by an FT station STA3. The SLT stage is performed by an SLT station STA4. In the DVS condition optimization system 100, the processor 12 can acquire pre-DVS data of the wafer before the wafer is processed by the DVS testing flow. Then, the processor 12 can generate the plurality of DVS block predict temperatures of the testing block to establish the correlation table by a machine learning architecture according to the pre-DVS data. For example, in FIG. 2, the pre-DVS data can be acquired from the CP stage performed by the CP station STA1. Therefore, the pre-DVS data of the CP stage can be regarded as input data D1 of the machine learning architecture. Further, the processor 12 can acquire testing block measurement temperatures from the CP station STA1. Therefore, the machine learning architecture can be trained by the input data D1 for generating a machine learning model. The machine learning model can be used for generating the DVS block predict temperatures. Therefore, the correlation table of the plurality of testing block measurement temperatures and a plurality of DVS block predict temperatures can be determined. Finally, a DVS block voltage can be outputted as inference data R1 from the processor 12 to the CP station STA1 for applying to the testing block in the die of the wafer. In FIG. 2, the wafer is processed by the DVS testing flow in the CP stage.

In FIG. 3, the pre-DVS data can be acquired from the CP stage performed by the CP station STA1 and the FT stage performed by the FT station STA3. Therefore, the pre-DVS data of the CP stage can be regarded as input data D1 of the machine learning architecture. The pre-DVS data of the FT stage can be regarded as input data D2 of the machine learning architecture. Further, the processor 12 can acquire testing block measurement temperatures from the FT station STA3. Therefore, the machine learning architecture can be trained by the input data D1 and the input data D2 for generating a machine learning model. The machine learning model can be used for generating the DVS block predict temperatures. Therefore, the correlation table of the plurality of testing block measurement temperatures and a plurality of DVS block predict temperatures can be determined. Finally, a DVS block voltage can be outputted as inference data R2 from the processor 12 to the FT station STA3 for applying to the testing block in the die of the wafer. In FIG. 3, the wafer is processed by the DVS testing flow in the FT stage.

In FIG. 4, the pre-DVS data can be acquired from the CP stage performed by the CP station STA1, the FT stage performed by the FT station STA3, and the SLT stage performed by the SLT station STA4. Therefore, the pre-DVS data of the CP stage can be regarded as input data D1 of the machine learning architecture. The pre-DVS data of the FT stage can be regarded as input data D2 of the machine learning architecture. The pre-DVS data of the SLT stage can be regarded as input data D3 of the machine learning architecture. Further, the processor 12 can acquire testing block measurement temperatures from the SLT station STA4. Therefore, the machine learning architecture can be trained by the input data D1, the input data D2, and the input data D3 for generating a machine learning model. The machine learning model can be used for generating the DVS block predict temperatures. Therefore, the correlation table of the plurality of testing block measurement temperatures and a plurality of DVS block predict temperatures can be determined. Finally, a DVS block voltage can be outputted as inference data R3 from the processor 12 to the SLT station STA4 for applying to the testing block in the die of the wafer. In FIG. 4, the wafer is processed by the DVS testing flow in the SLT stage.

In the DVS condition optimization system 100, the correlation table can be generated by using the machine learning model by the processor 12. In other embodiments, the correlation table can be acquired by any reasonable method. Any reasonable technology or hardware modification falls into the scope of the present invention.

Figure 5:
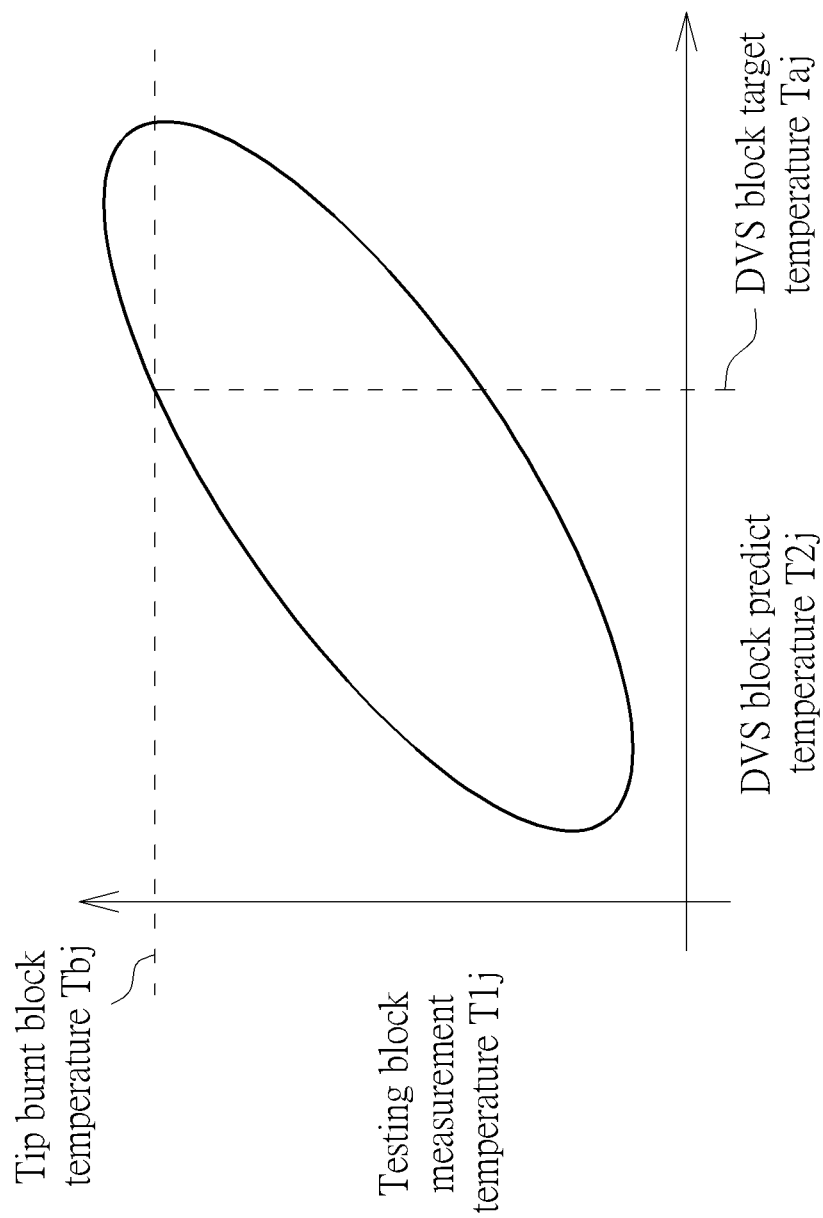
FIG. 5 is an illustration of a correlation table of the dynamic voltage stress condition optimization system in FIG. 1.

FIG. 5 is an illustration of the correlation table of the DVS condition optimization system 100. In FIG. 5, Y-axis is a testing block measurement temperature of the j-th testing block, denoted as T$1j$. X-axis is a DVS block predict temperature of the j-th testing block, denoted as T$2j$. The tip burnt block temperature of the j-th testing block is denoted as Tbj. The tip burnt block temperature Tbj can be regarded as the maximum tolerance temperature of the j-th testing block under the DVS testing flow. According to the tip burnt block temperature Tbj and the correlation table, the DVS block target temperature of the j-th testing block can be determined, denoted as Taj. In other words, when the DVS block voltage corresponding to the DVS block target temperature Taj is applied to the j-th testing block for performing the DVS testing flow, a testing block measurement temperature of the j-th testing block approaches to the tip burnt block temperature Tbj. In other words, when the processor 12 increases the DVS block voltage for approaching the testing block measurement temperature to the tip burnt block temperature Tbj, the DVS block voltage applied to the j-th testing block is increased, leading to defect parts per million (DPPM) reduction.

Figure 6:
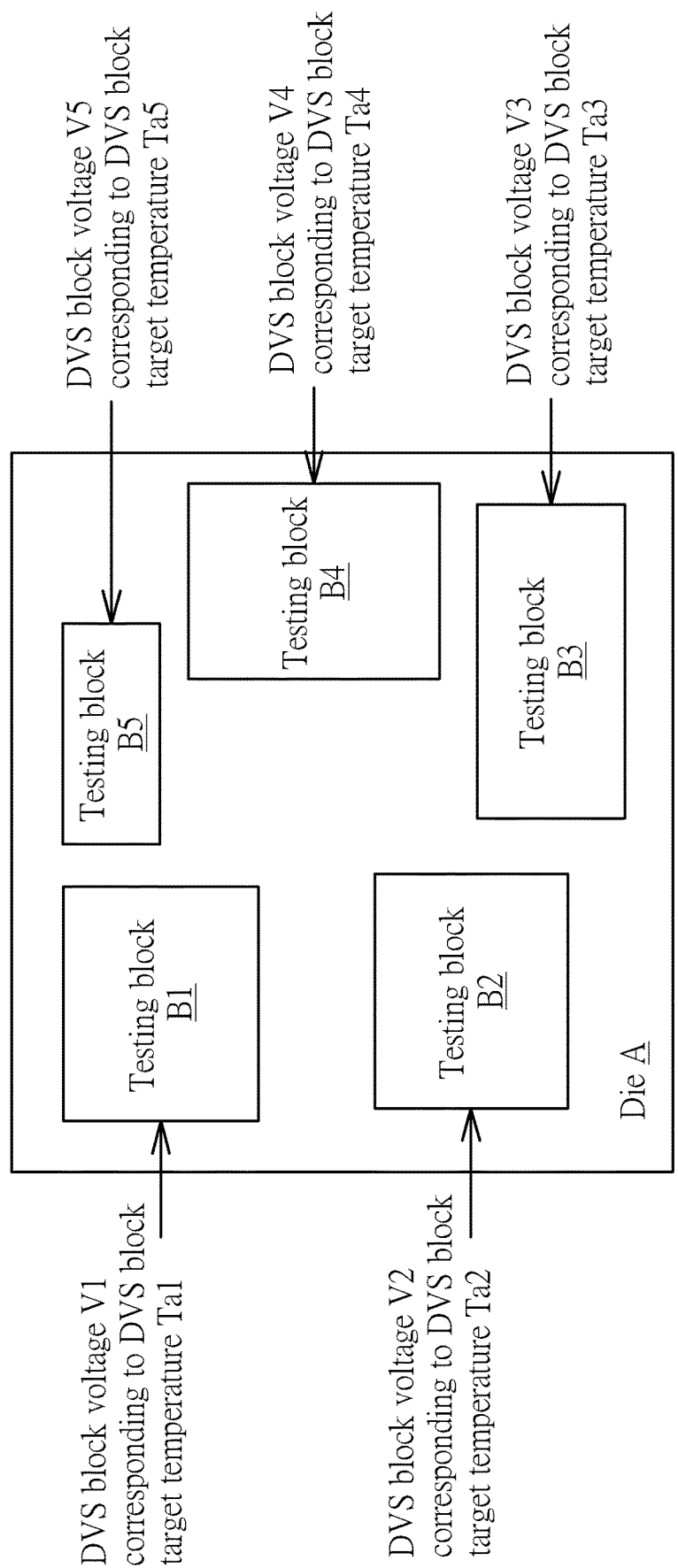
FIG. 6 is an illustration of applying different DVS block voltages to different testing blocks in a die of a wafer by using the dynamic voltage stress condition optimization system in FIG. 1.

FIG. 6 is an illustration of applying different DVS block voltages to different testing blocks in the die A of the wafer by using the DVS condition optimization system 100. As previously mentioned, the die A of the wafer includes the plurality of testing blocks. The plurality of testing blocks can be applied with different DVS block voltages. For example, in FIG. 6, the die A includes a testing block B1, a testing block B2, a testing block B3, a testing block B4, and a testing block B5 (i.e., j=5). The DVS block voltage V1 corresponding to a DVS block target temperature Ta1 is applied to the testing block B1. The DVS block voltage V2 corresponding to a DVS block target temperature Ta2 is applied to the testing block B2. The DVS block voltage V3 corresponding to a DVS block target temperature Ta3 is applied to the testing block B3. The DVS block voltage V4 corresponding to a DVS block target temperature Ta4 is applied to the testing block B4. The DVS block voltage V5 corresponding to a DVS block target temperature Ta5 is applied to the testing block B5. Since the DVS block voltages can be adaptively applied to corresponding testing blocks, the efficiency and accuracy of the DVS testing flow can be improved.

Figure 7:
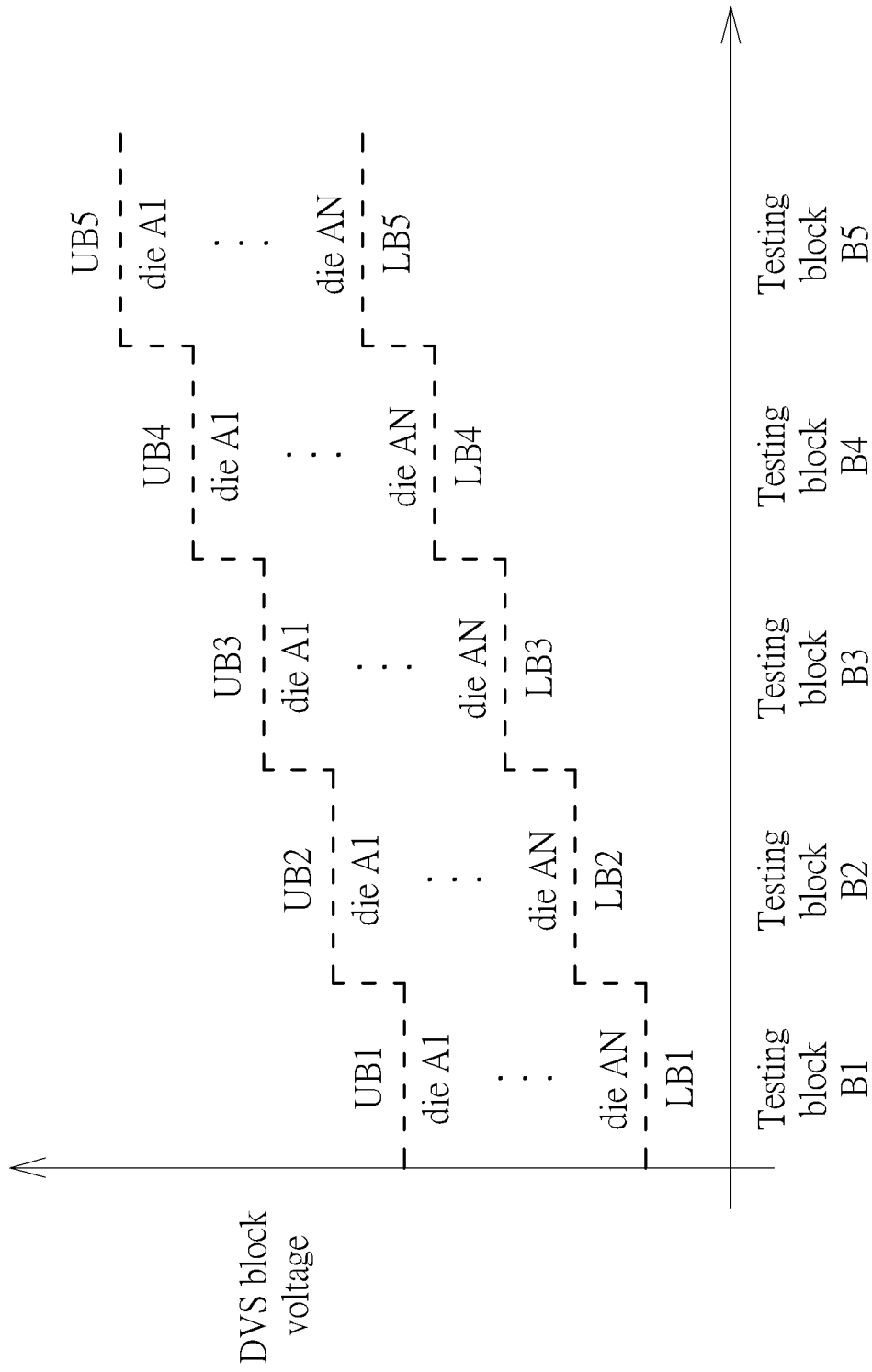
FIG. 7 is an illustration of setting different tip burnt boundary bands to different testing blocks by using the dynamic voltage stress condition optimization system in FIG. 1.

FIG. 7 is an illustration of setting different tip burnt boundary bands to different testing blocks by using the DVS condition optimization system 100. In the DVS condition optimization system 100, the plurality of testing blocks can be applied with different DVS block voltages. Further, the wafer includes a plurality of dies. DVS characteristics of the plurality of dies are different due to manufacturing differences. Therefore, a tip burnt boundary band can be determined according to the DVS characteristics of the plurality of dies. For example, in FIG. 7, for the testing block B1, a tip burnt boundary band of a die A1 to a die AN is between an upper bound DVS block voltage UB1 and a lower bound DVS block voltage LB1. For the testing block B2, a tip burnt boundary band of the die A1 to the die AN is between an upper bound DVS block voltage UB2 and a lower bound DVS block voltage LB2. For the testing block B3, a tip burnt boundary band of the die A1 to the die AN is between an upper bound DVS block voltage UB3 and a lower bound DVS block voltage LB3. For the testing block B4, a tip burnt boundary band of the die A1 to the die AN is between an upper bound DVS block voltage UB4 and a lower bound DVS block voltage LB4. For the testing block B5, a tip burnt boundary band of the die A1 to the die AN is between an upper bound DVS block voltage UB5 and a lower bound DVS block voltage LB5. In other words, for N dies, when the tip burnt boundary band is determined according to the upper bound DVS block voltage and the lower bound DVS block voltage by the processor 12, the DVS block voltage applied to the testing block is between the upper bound DVS block voltage and the lower bound DVS block voltage.

Figure 8:
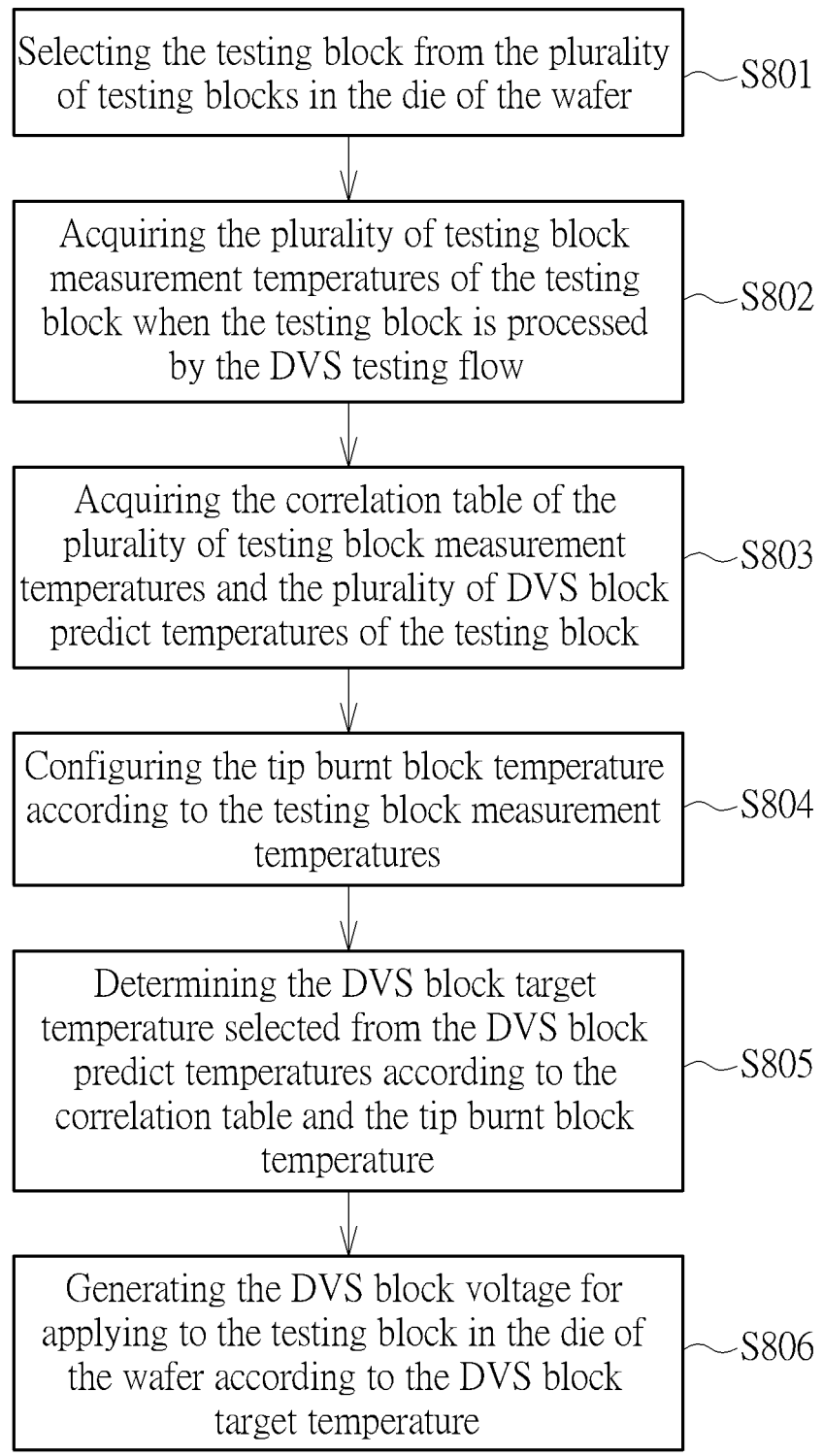
FIG. 8 is a flow chart of performing a dynamic voltage stress condition optimization method by the dynamic voltage stress condition optimization system in FIG. 1.

FIG. 8 is a flow chart of performing a DVS condition optimization method by the DVS condition optimization system 100. The DVS condition optimization method includes step S801 to step S806. Any reasonable technology modification falls into the scope of the present invention. Step S801 to step S806 are illustrated below.

Step S801: selecting the testing block from the plurality of testing blocks in the die of the wafer;

Step S802: acquiring the plurality of testing block measurement temperatures of the testing block when the testing block is processed by the DVS testing flow;

Step S803: acquiring the correlation table of the plurality of testing block measurement temperatures and the plurality of DVS block predict temperatures of the testing block;

Step S804: configuring the tip burnt block temperature according to the testing block measurement temperatures;

Step S805: determining the DVS block target temperature selected from the DVS block predict temperatures according to the correlation table and the tip burnt block temperature;

Step S806: generating the DVS block voltage for applying to the testing block in the die of the wafer according to the DVS block target temperature.

Details of step S801 to step S806 are previously illustrated. Thus, they are omitted here. In the DVS condition optimization system 100, since the DVS block voltage can be generated according to the DVS block target temperature, when the testing block is processed by the DVS testing flow, the testing block measurement temperature can approach the tip burnt block temperature. Therefore, the DVS block voltage of the DVS testing flow can be optimized.

To sum up, the present invention discloses a DVS condition optimization method and a DVS condition optimization system. The DVS condition optimization system can be regarded as a block-based DVS block voltage allocation system. Specifically, the DVS block voltage can be generated according to the DVS block target temperature. When the testing block is processed by the DVS testing flow, the testing block measurement temperature can approach the tip burnt block temperature. Therefore, the DVS block voltage of the DVS testing flow can be optimized. Further, the plurality of testing blocks can be applied with different DVS block voltages. Since the DVS block voltages can be adaptively applied to corresponding testing blocks, the efficiency and accuracy of the DVS testing flow can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dynamic voltage stress (DVS) condition optimization method comprising:
   selecting a testing block from a plurality of testing blocks in a die of a wafer;
   acquiring a plurality of testing block measurement temperatures of the testing block when the testing block is processed by a DVS testing flow;
   acquiring a correlation table of the plurality of testing block measurement temperatures and a plurality of DVS block predict temperatures of the testing block;
   configuring a tip burnt block temperature according to the testing block measurement temperatures;
   determining a DVS block target temperature selected from the DVS block predict temperatures according to the correlation table and the tip burnt block temperature; and
   generating a DVS block voltage for applying to the testing block in the die of the wafer according to the DVS block target temperature.

2. The method of claim 1, further comprising:
   adjusting the DVS block voltage for applying to another testing block in the die of the wafer.

3. The method of claim 1, further comprising:
   acquiring pre-DVS data of the wafer before the wafer is processed by the DVS testing flow; and
   generating the plurality of DVS block predict temperatures of the testing block to establish the correlation table by a machine learning architecture according to the pre-DVS data.

4. The method of claim 3, wherein the pre-DVS data is acquired from a chip probe (CP) stage of a wafer testing flow, and the wafer is processed by the DVS testing flow in the CP stage.

5. The method of claim 3, wherein the pre-DVS data is acquired from a chip probe (CP) stage and a final test (FT) stage of a wafer testing flow, and the wafer is processed by the DVS testing flow in the FT stage.

6. The method of claim 3, wherein the pre-DVS data is acquired from a chip probe (CP) stage, a final test (FT) stage, and a system-level testing (SLT) stage of a wafer testing flow, and the wafer is processed by the DVS testing flow in the SLT stage.

7. The method of claim 1, wherein the die of the wafer comprises a plurality of testing blocks, and the plurality of testing blocks are applied with different DVS block voltages.

8. The method of claim 1, further comprising:
setting an upper bound DVS block voltage;
setting a lower bound DVS block voltage; and
wherein the DVS block voltage is between the upper bound DVS block voltage and the lower bound DVS block voltage.

9. The method of claim 8, wherein the wafer comprises a plurality of dies, the upper bound DVS block voltage and the lower bound DVS block voltage are determined according to DVS characteristics of the plurality of dies.

10. The method of claim 1, further comprising:
increasing the DVS block voltage for approaching a testing block measurement temperature to the tip burnt block temperature;
wherein when the DVS block voltage is increased, defect parts per million (DPPM) is reduced.

11. A dynamic voltage stress (DVS) condition optimization system comprising:
at least one wafer testing station;
a memory; and
a processor coupled to the memory and the at least one wafer testing station;
wherein the processor selects a testing block from a plurality of testing blocks in a die of a wafer, the processor acquires a plurality of testing block measurement temperatures of the testing block from the at least one wafer testing station when the testing block is processed by a DVS testing flow, the processor acquires a correlation table of the plurality of testing block measurement temperatures and a plurality of DVS block predict temperatures of the testing block, the correlation table is saved in the memory, the processor configures a tip burnt block temperature according to the testing block measurement temperatures, the processor determines a DVS block target temperature selected from the DVS block predict temperatures according to the correlation table and the tip burnt block temperature, and the processor generates a DVS block voltage for applying to the testing block in the die of the wafer according to the DVS block target temperature.

12. The system of claim 11, wherein the processor adjusts the DVS block voltage for applying to another testing block in the die of the wafer.

13. The system of claim 11, wherein the processor acquires pre-DVS data of the wafer before the wafer is processed by the DVS testing flow, and the processor generates the plurality of DVS block predict temperatures of the testing block to establish the correlation table by a machine learning architecture according to the pre-DVS data.

14. The system of claim 13, wherein the pre-DVS data is acquired from a chip probe (CP) stage performed by a CP station, and the wafer is processed by the DVS testing flow in the CP stage.

15. The system of claim 13, wherein the pre-DVS data is acquired from a chip probe (CP) stage performed by a CP station and a final test (FT) stage performed by an FT station, and the wafer is processed by the DVS testing flow in the FT stage.

16. The system of claim 13, wherein the pre-DVS data is acquired from a chip probe (CP) stage performed by a CP station, a final test (FT) stage performed by an FT station, and a system-level testing (SLT) stage performed by a SLT station, and the wafer is processed by the DVS testing flow in the SLT stage.

17. The system of claim 11, wherein the die of the wafer comprises a plurality of testing blocks, and the plurality of testing blocks are applied with different DVS block voltages.

18. The system of claim 11, wherein the processor sets an upper bound DVS block voltage, the processor sets a lower bound DVS block voltage, and the DVS block voltage is between the upper bound DVS block voltage and the lower bound DVS block voltage.

19. The system of claim 18, wherein the wafer comprises a plurality of dies, the upper bound DVS block voltage and the lower bound DVS block voltage are determined according to DVS characteristics of the plurality of dies.

20. The system of claim 11, wherein the processor increases the DVS block voltage for approaching testing block measurement temperature to the tip burnt block temperature, and when the DVS block voltage is increased, defect parts per million (DPPM) is reduced.

* * * * *